United States Patent Office 2,978,419
Patented Apr. 4, 1961

2,978,419

STABILIZATION OF AQUEOUS COLLOIDAL SOLUTIONS OF SILICA

Edwin R. Birkhimer, Laurel Springs, N.J., assignor to The Atlantic Refining Company, Philadelphia, Pa., a corporation of Pennsylvania No Drawing. Filed Feb. 4, 1957, Ser. No. 637,866

6 Claims. (Cl. 252—313)

This invention relates to the stabilization of colloidal solutions of silica, in particular colloidal solutions of silica in an aqueous medium.

About the middle of the nineteenth century, Thomas Graham published a series of classical papers relating to silicic acid and its preparation. He described a pure solution of hydrated silicic acid as being "limpid and colorless and not in the least degree viscous, even with 14 percent of silicic acid." He stated that a solution of silica could be obtained by pouring silicate of soda into dilute hydrochloric acid, the acid being in large excess. He pointed out that such a solution would contain sodium chloride which would cause the silica to gelatinize when the solution was heated, but when this solution was dialyzed, such as through parchment paper, to remove the hydrochloric acid and salt, a pure colloidal aqueous solution of silica was produced.

In studying such purified solutions of silica, he discovered that they coagulated readily, that is, the silicic acid was converted into a gelatinous form thereby losing its miscibility with water, and that this change could be brought about by time alone. He recognized, therefore, the instability of colloidal solutions of silica, i.e. the irreversible change of one form into another, and in fact gave names to the two forms. The colloidal solution of silica in an aqueous medium he termed a "hydrosol" and the gelatinous form into which it changed he termed a "hydrogel."

A relatively modern method of preparing a colloidal solution of silica which has found considerable favor involves diluting ordinary water glass, i.e. an aqueous solution of sodium silicate (generally a 28 percent to 30 percent solution expressed as $SiO_2$) with about 9 volumes of demineralized water so that the diluted solution will contain about 3 percent of $SiO_2$. This solution is then passed over a zeolitic material or a cation exchange resin, such materials being in the acid cycle, to remove the sodium ions and produce an aqueous dispersion of silica containing only a small amount of sodium in which the ratio of $SiO_2$ to $Na_2O$ may be of the order of 1000 to 1, or even higher. The ratio which is obtained depends upon the type of cation exchange resin employed as well as the rate with which the solution is passed through the ion exchange bed.

Colloidal solutions of silica prepared according to this method, however, likewise exhibit the usual instability since on merely standing from 1 to 3 days they are converted into the gel form.

Since the various methods of preparing colloidal silica solutions produce solutions which are unstable, numerous attempts have been made to stabilize such solutions by the addition to them of various organic or inorganic compounds. Although claims have been made for the successful stabilization of colloidal silica solutions using certain organic and inorganic compounds, it will be obvious that the introduction of these foreign materials may severely limit the use of such solutions, particularly in the case where the colloidal solution of silica is to be used in the preparation of catalysts.

For example, it has been proposed that rather small amounts of alkali metal hydroxides be used to stabilize colloidal silica solutions. If such colloidal silica is to be used in the preparation of a silica-alumina hydrocarbon cracking catalyst, the introduction of an alkali metal in connection with the silica will severely lower the cracking activity of the catalyst.

While ammonium hydroxide likewise will stabilize colloidal solutions of silica, it has been found in connection with the preparation of other types of catalysts that the presence of appreciable quantities of ammonium ion is definitely harmful and the resulting catalyst will have a lowered activity.

It has now been found that colloidal silica solutions in an aqueous medium may be stabilized by a particular treatment which will not leave harmful cationic or anionic impurities in the colloidal solution. Such solutions can be stored for extended periods of time and thereafter used in the preparation of catalysts or in other uses where even the most minute amounts of impurities cannot be tolerated.

It is an object of this invention to provide a method for the stabilization of colloidal solutions of silica in an aqueous medium.

It is a further object of this invention to provide a method for the stabilization of colloidal solutions of silica in an aqueous medium by treating such solutions with ammonia and thereafter removing the ammonia from the said colloidal solution.

In accordance with the method of this invention, a colloidal solution of silica in an aqueous medium is prepared by any known conventional method which will produce a solution relatively free of ionic impurities. To this solution is added ammonia either in the gaseous form or as ammonium hydroxide in an amount such that at least 1.5 percent by weight of $NH_3$ is added based on the weight of $SiO_2$ present in the colloidal solution. After adding the ammonia to the colloidal solution, it is then removed as completely as possible, preferably by heating to vaporize the ammonia or more preferably by passing the colloidal solution containing the ammonia over a cation exchange bed which is in the acid cycle. It is of course undesirable to attempt to remove the ammonia by reaction with a strong acid, since such a treatment will introduce ionic impurities into the colloidal solution of the silica and thus render it unstable. The colloidal solution of silica which has been treated with ammonia and then has had the ammonia removed will remain stable for extremely long periods of time up to several months.

It has been found that the length of time that the ammonia remains in contact with the colloidal solution of silica prior to removal has an effect on the stability. If the ammonia is allowed to remain in contact with the colloidal solution of silica for at least 16 hours prior to removal, maximum stability of the finished colloidal solution is obtained. Longer times of contact give little or no increase in stability. Contact times as short as from 2 to 3 hours will produce colloidal solutions of silica having a 15 to 30 fold increase in stability over untreated solutions.

The cation exchange resin may be any one of the large number of commercially available materials, such as Amberlite IR–120 which is a very high capacity sulfonic acid type cation exchanger produced by the Rohm and Haas Company, Philadelphia, Pa., or Permutit–Q which is a sulfonated hydrocarbon polymer produced by the Permutit Company, New York, New York. Since these materials are well known to the art of ion exchange and since their individual capacities, rate of exchange and similar properties are supplied by the manufacturer further description thereof is believed unnecessary.

Either synthetic or natural zeolites may be used instead of the above mentioned cation exchange resins for removing the ammonia from the treated colloidal solution of silica. In all cases of course the cation exchange resin or zeolite must have been treated with an acidic reagent, or in other words be in the acid cycle, in order that the ammonium ions will be exchanged for the hydrogen ions of the resin or zeolite.

As pointed out above, the ammonia may be either in the gaseous form or in the form of ammonium hydroxide and in the latter case the ammonia may range in concentrations from dilute to concentrated, the latter being approximately 28 percent. The higher concentrations are preferred since they will dilute the colloidal solution to a lesser degree, although obviously if the extent of dilution is not a factor lower concentrations of ammonia may be used. While as little as 1.5 percent by weight of ammonia may be added to the colloidal solution of silica based on the weight of the $SiO_2$ present, it has been found preferable to add from about 3 percent to about 6 percent by weight of ammonia since under these conditions maximum stabilization is obtained.

In order to illustrate the various aspects of the invention the following examples are presented.

Example I

A colloidal solution of silica was prepared by diluting one volume of a commercial sample of water glass (sodium silicate containing approximately 28 percent by weight $SiO_2$ by analysis) with 9 volumes of demineralized water and passing the diluted solution over a cation exchange resin in the acid cycle (Amberlite IR–120) and collecting the effluent of colloidal silica in the form of the hydrosol. An analysis of the effluent showed it to contain approximately 3.8 percent by weight of silica.

One portion of this material was allowed to stand without treatment. To a second portion of the solution a concentrated aqueous ammonia solution (assaying 28 percent $NH_3$) was added at the rate of one milliliter per 125 ml. of colloidal solution. The amount of ammonia based on the weight of $SiO_2$ was thus about 5.9 percent. This solution was divided into two portions and one portion after standing for approximately one hour was distilled until the solution reached a pH of 6. During the distillation additional demineralized water was added to replace that lost by vaporization, and upon completion of the distillation no detectable amount of ammonia remained.

The blank solution which had not been treated and the solution which had been treated were allowed to stand undisturbed and the time measured for gelation to occur. In the case of the untreated colloidal solution gelation commenced in one day and was complete in three days. In the case of the treated solution no gelation whatsoever was observed in excess of 21 days and only after several additional weeks was gelation clearly discernible.

Example II

The second portion of the ammonia treated colloidal solution of silica prepared for Example I instead of being distilled was allowed to stand approximately 16 hours and thereafter the ammonia was removed therefrom by passing the solution over a bed of cation exchange resin (Amberlite IR–120) which was in the acid cycle. The effluent colloidal solution of silica was found to contain only a barely detectable amount of ammonia of the order of a few parts per million. The colloidal solution of this example began gelation after approximately 4½ months.

Example III

In order to show that the stabilization of the colloidal solution of silica obtained by this invention does not result from residual amounts of ammonia left in the solution after treatment, a third portion of the fresh colloidal solution of silica prepared for Example I was treated by the addition of approximately 0.6 percent of ammonia based on the weight of the silica contained therein. The stability of this solution was found to be the same as that for the untreated colloidal solution of silica since it started to gel within about one day and had completely gelled at the end of about three days.

The stabilized colloidal solutions of silica prepared in accordance with this invention are particularly useful for the treatment of water such as the clarification of turbid water, sewage effluents, and the like, and in the preparation of catalysts wherein high purity of silica is particularly desirable, such as in the preparation of catalytic cracking catalysts and catalytic reforming catalysts for use in petroleum processing operations.

It has been found that the ion exchange materials when used to remove ammonia eventually become saturated and lose their exchange ability, but when this occurs they may be regenerated simply by treating with a dilute hydrochloric acid solution and reused.

I claim:

1. A process for the stabilization of unstable colloidal solutions of silica, substantially free of ionic impurities, in an aqueous medium which comprises adding to the colloidal solution from 1.5 percent to 6.0 percent by weight of ammonia, based on the weight of $SiO_2$, maintaining the ammonia in contact with the colloidal solution of silica for at least two hours and thereafter removing substantially all of the ammonia to the extent that only a few parts per million of ammonia remain.

2. A process for the stabilization of unstable colloidal solutions of silica, substantially free of ionic impurities, in an aqueous medium which comprises adding to the colloidal solution from 3.0 percent to 6.0 percent by weight of ammonia, based on the weight of $SiO_2$, maintaining the ammonia in contact with the colloidal solution of silica for a period of time ranging between about two hours and about 16 hours and thereafter removing substantially all of the ammonia to the extent that only a few parts per million of ammonia remain.

3. A process for the stabilization of unstable colloidal solutions of silica, substantially free of ionic impurities, in an aqueaus medium which comprises adding to the colloidal solution from 1.5 percent to 6.0 percent by weight of ammonia based on the weight of $SiO_2$, maintaining the ammonia in contact with the colloidal solution of silica for at least two hours and thereafter removing substantially all of the ammonia from the colloidal solution of silica by distillation to the extent that only a few parts per million of ammonia remain.

4. A process for the stabilization of unstable colloidal solutions of silica, substantially free of ionic impurities, in an aqueous medium which comprises adding to the colloidal solution from 3.0 percent to 6.0 percent by weight of ammonia, based on the weight of $SiO_2$, maintaining the ammonia in contact with the colloidal solution of silica for a period of time ranging between about two hours and about 16 hours and thereafter removing substantially all of the ammonia from the colloidal solution of silica by distillation to the extent that only a few parts per million of ammonia remain.

5. A process for the stabilization of unstable colloidal solutions of silica, substantially free of ionic impurities, in an aqueous medium which comprises adding to the colloidal solution from 1.5 percent to 6.0 percent by weight of ammonia based on the weight of $SiO_2$, maintaining the ammonia in contact with the colloidal solution of silica for at least two hours and thereafter removing substantially all of the ammonia from the colloidal solution of silica by passing the ammonia-containing solution over a bed of cation exchange resin which is in the acid cycle to the extent that only a few parts per million of ammonia remain.

6. A process for the stabilization of unstable colloidal solutions of silica, substantially free of ionic impurities, in an aqueous medium which comprises adding to the colloidal solution from 3.0 percent to 6.0 percent by weight of ammonia, based on the weight of $SiO_2$, maintaining the ammonia in contact with the colloidal solution of silica for a period of time ranging between about two hours and about 16 hours and thereafter removing substantially all of the ammonia from the colloidal solution of silica by passing the ammonia-containing solution over a period of cation exchange resin which is in the acid cycle to the extent that only a few parts per million of ammonia remain.

References Cited in the file of this patent

UNITED STATES PATENTS

| 2,244,325 | Bird | June 3, 1941 |
| 2,444,774 | Hay | July 6, 1948 |
| 2,614,995 | Balthis | Oct. 21, 1952 |

OTHER REFERENCES

"The Colloid Chemistry of Silica and Silicates" (Iler), pub. by Cornell Univ. Press (Ithaca, N.Y.), 1955 (page 111).